E. R. PACKER.
MOTOR DRIVEN RAIL SAW.
APPLICATION FILED APR. 28, 1915.

1,326,285.

Patented Dec. 30, 1919.
5 SHEETS—SHEET 1.

INVENTOR:
Eben R. Packer
BY
Chamberlin+Freudenreich
ATTORNEYS.

E. R. PACKER.
MOTOR DRIVEN RAIL SAW.
APPLICATION FILED APR. 28, 1915.

1,326,285.

Patented Dec. 30, 1919.
5 SHEETS—SHEET 3.

INVENTOR:
Eben R. Packer
BY
Chamberlin Freudenreich
ATTORNEYS.

E. R. PACKER.
MOTOR DRIVEN RAIL SAW.
APPLICATION FILED APR. 28, 1915.
1,326,285.
Patented Dec. 30, 1919.
5 SHEETS—SHEET 4.
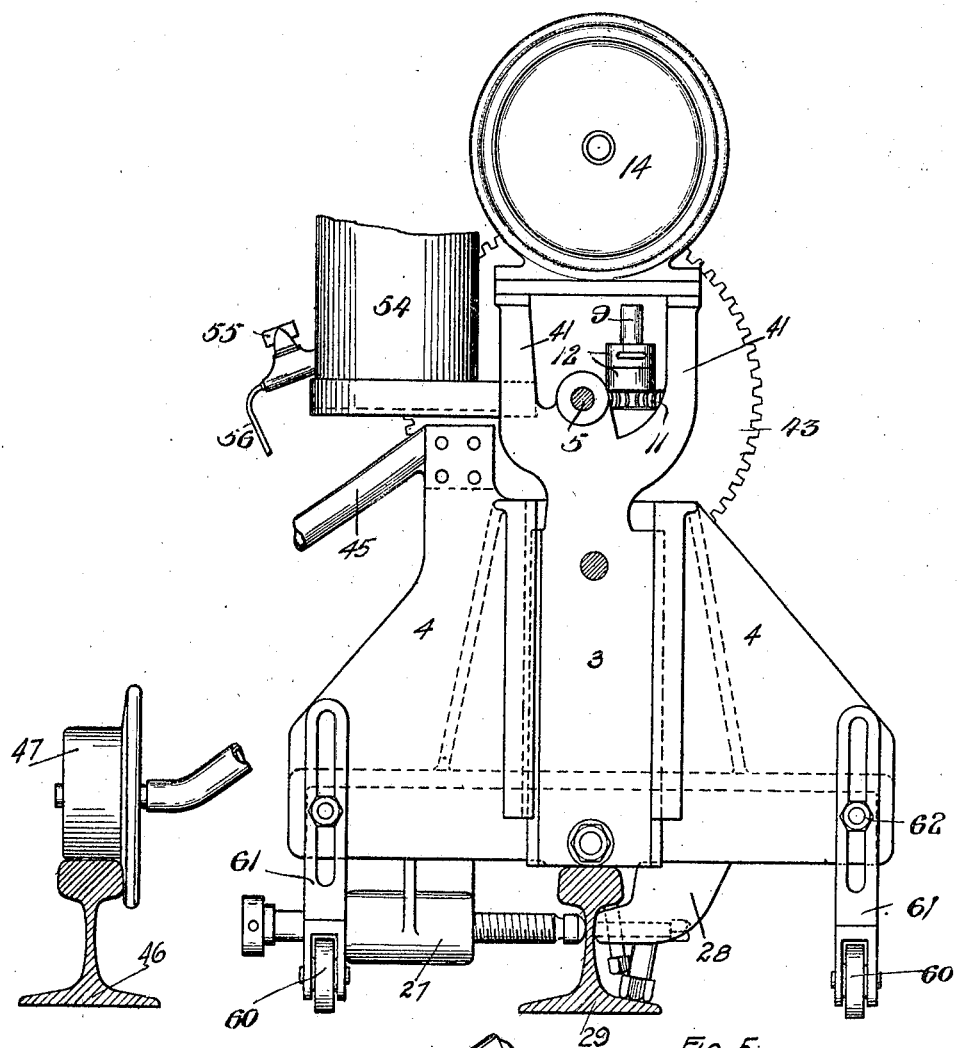
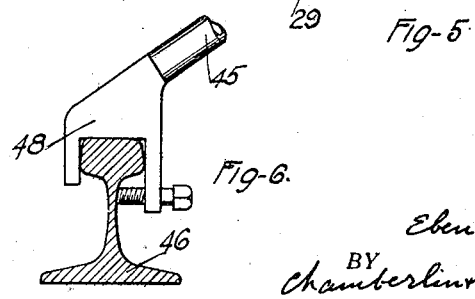
INVENTOR:
Eben R. Packer
BY
Chamberlin + Freudenreich
ATTORNEYS.

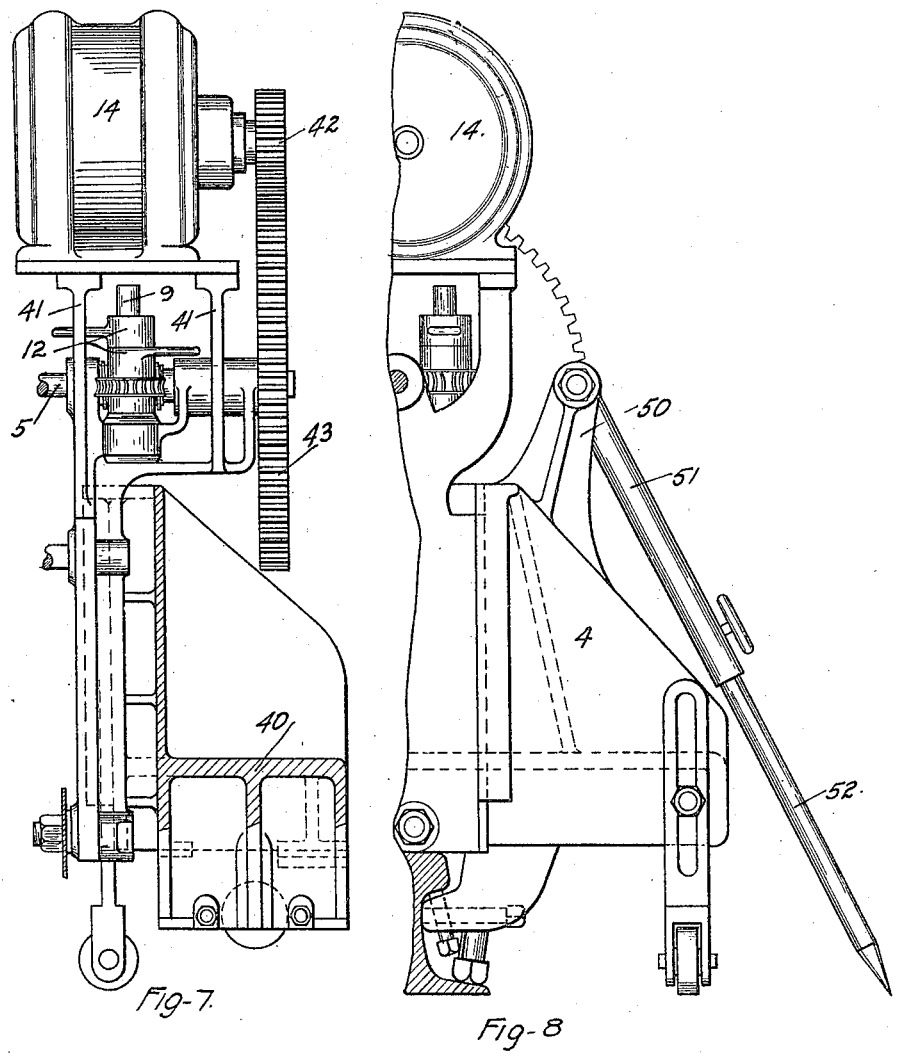

UNITED STATES PATENT OFFICE.

EBEN R. PACKER, OF WILMETTE, ILLINOIS.

MOTOR-DRIVEN RAIL-SAW.

1,326,285.  Specification of Letters Patent.  Patented Dec. 30, 1919.

Application filed April 28, 1915. Serial No. 24,391.

*To all whom it may concern:*

Be it known that I, EBEN R. PACKER, a citizen of the United States, residing at Wilmette, county of Cook, State of Illinois, have invented a certain new and useful Improvement in Motor-Driven Rail-Saws, and declare the following to be a full, clear, and exact description of the same, such as will enable others skilled in the art to which it pertains to make and use the same, reference being had to the accompanying drawings, which form a part of this specification.

My invention relates to portable rail saws and has for its object to produce a simple efficient self-contained motor-driven apparatus.

The various features of novelty whereby my invention is characterized will hereinafter be pointed out with particularity in the claims; but, for a full understanding of my invention and of its object and advantages, reference may be had to the following detailed description taken in connection with the accompanying drawings, wherein:

Fig. 5 is a front elevation of a modified arrangement, the saw and the gearing in front of the framework being omitted;

Fig. 6 is a detail illustrating a modified clamping foot for the supporting brace in the construction illustrated in Fig. 5;

Fig. 7 is a vertical longitudinal section taken approximately through the center of the machine illustrated in Fig. 5; and Fig. 8 is a view similar to Fig. 5, showing only a portion of the machine and a modified brace.

Figure 1:
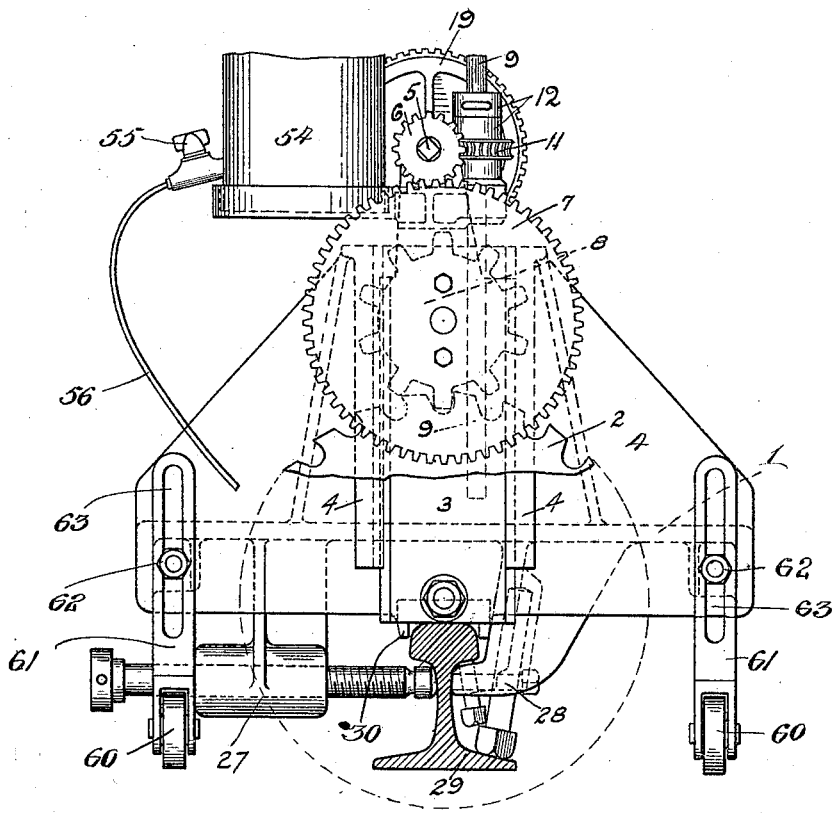
Figure 1 is a front elevation of an apparatus arranged in accordance with one form of my invention mounted on a railway rail which is shown in section.
Figure 2:
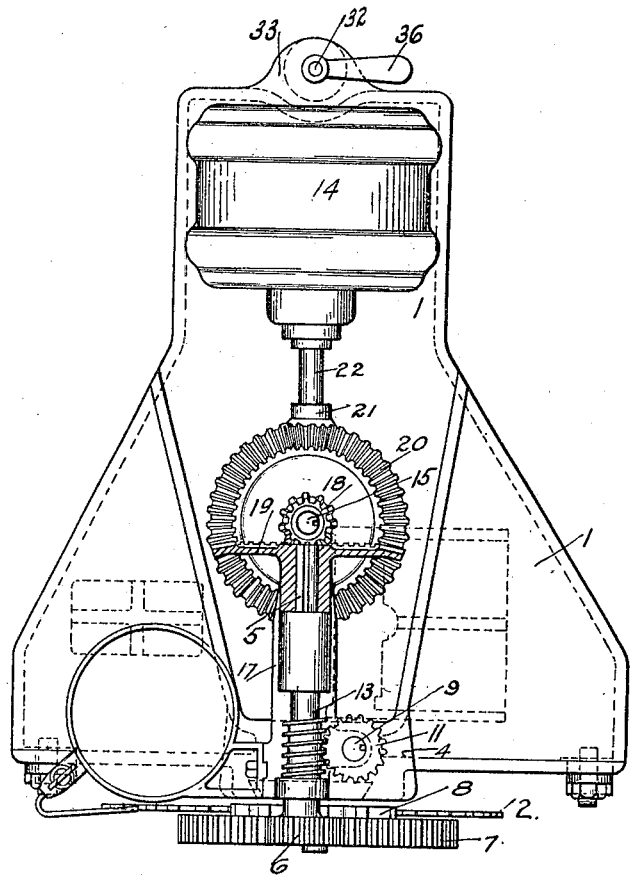
Fig. 2 is a top plan view of the apparatus shown in Fig. 1 one of the gear wheels being in section.
Figure 3:
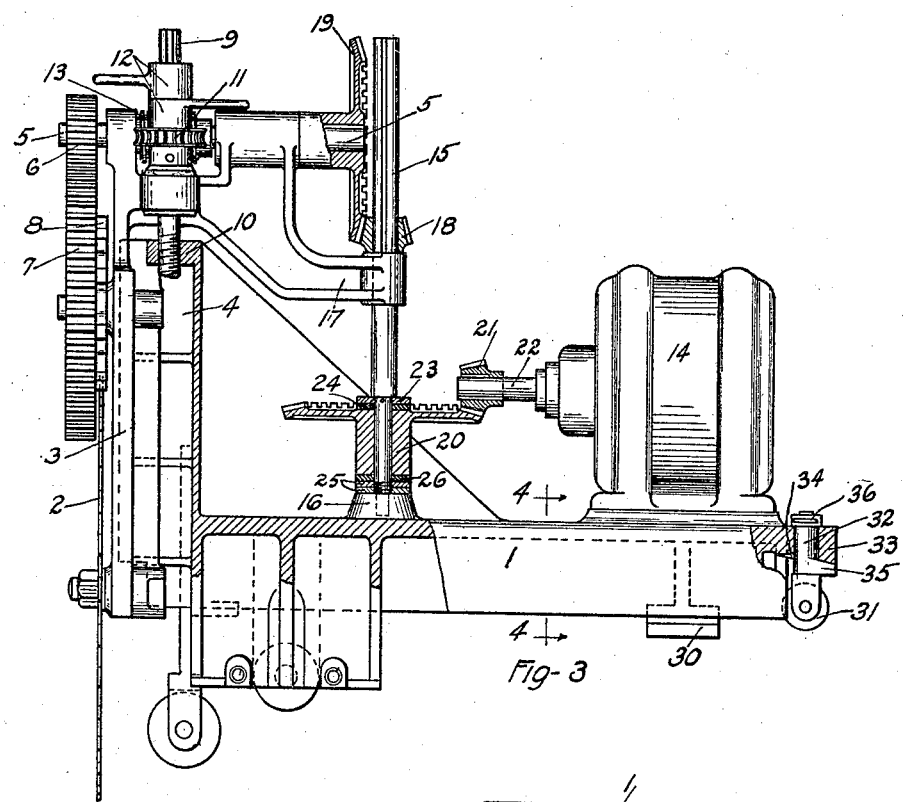
Fig. 3 is a vertical longitudinal section taken approximately at the center of the machine.
Figure 4:
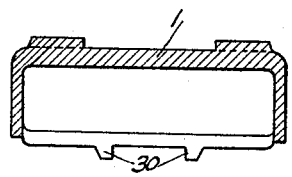
Fig. 4 is a section through the base of the machine taken approximately on line 4—4 of Fig. 3.

Referring to Figs. 1 to 4 of the drawings, 1 represents a long flat platform or base wider at the front than at the rear. 2 is a suitable rail saw mounted upon a vertically movable slide, 3, arranged in upright guides, 4, at the front of the base or platform. At the top of the member 3 is a horizontal shaft, 5, provided with a pinion, 6, meshing with a gear wheel, 7, having attached to the rear side thereof a pinion, 8, which meshes with the teeth of the saw. Beside the shaft 5 is a vertical screw shaft, 9, which extends down and is screw threaded into a boss, 10, or other member of the stationary frame composed of the base or platform and the upright portion. On the shaft 9 is a loose worm wheel, 11, held in place by suitable handled nuts, 12, which, when released, leave the worm wheel loose on the screw shaft. On the shaft 5 is a worm, 13, meshing with the worm wheel. The parts are so proportioned that when the shaft 5 is driven and causes the saw to be rotated, it also turns the screw shaft at the proper speed to lower the saw-supporting slide and feed the saw into the work.

On the rear end of the base or platform is mounted a suitable motor, 14. Between the motor and the rear end of the shaft 5 is mounted a vertical shaft, 15. Suitable driving connections are provided between the motor and the shaft 15 and between this shaft and the shaft 5 so that when the motor is operated the shaft 5 and therefore the saw will be driven regardless of the position of the saw-supporting slide. In the arrangement illustrated, the shaft 15 has its lower end projecting into a boss, 16, projecting upwardly from the base or platform, while the upper end projects through a suitable bearing in an arm, 17, extending rearwardly from the saw-supporting slide at a point beneath the main shaft 5. The arm 17 forms the upper bearing for the shaft 15 and slides up and down the same as the saw is raised and lowered. Splined on the shaft 15 above the arm 17 is a bevel pinion, 18, meshing with a complementary gear wheel, 19, fixed upon the rear end of the shaft 5. The pinion is prevented from being displaced by reason of its engagement with the gear wheel 19 on one side and with the arm 17 on the under side, the pinion sliding up and down the shaft 15 as the saw is raised and lowered. Upon the lower end of the shaft 15, above the boss 16, is a bevel gear, 20, meshing with a pinion, 21, on the motor shaft 22. In order to protect the machine in case the saw is overloaded or sticks while the motor is running, I support one of the gear members frictionally upon its shaft so that it will yield before the danger point is reached. In the arrangement shown, the safety device is applied to the gear 20. Thus above the gear 20 there is arranged on the shaft 15 a plate or shoe, 23, of considerable diameter. Between the members 20 and 23 is a wearing member, 24, which may conveniently take the form of a fiber disk. On the shaft below the gear wheel 20 are two disks, 25, similar to the disk 23, preferably screw threaded upon the shaft so that each will serve as a lock for the other and permit accurate adjustment to be made. Between the disks 25 and the gear wheel is a disk, 26, corresponding to the disk 24. When the parts are assembled, the nut-like disks, 25, are screwed up until the proper frictional pressure is obtained upon the gear wheel 20 so that the gear wheel will, under normal conditions, drive the shaft 15, but, under an abnormally heavy load, will slip and allow the shaft 15 to stand still even though the motor be running. It will be seen that the disks 25 may also serve as a thrust bearing which takes the weight of the shaft 15, if desired.

Beneath the front end of the base or platform are suitable clamping devices, 27 and 28, for clamping the base or platform upon a rail, 29. These clamping devices are at the present time well known and therefore require no detailed description. On the under side of the base or platform, near the rear end thereof, I arrange a seat, 30, adapted to embrace the upper portion of the head of the rail so as to prevent accidental lateral movement; this seat with the clamping devices insuring perfect alinement upon the rail. At the extreme rear end of the base 1 have arranged an adjustable rolling support which may be brought into play to take the weight of the rear end of the machine when it is being shifted along the rail and at other times be placed in an idle position. In the arrangement shown, this rolling support comprises a small wheel or roller, 31, on the lower end of a vertical shaft, 32, which extends through an ear, 33, at the rear end of the base or platform. The under face of the ear 33 surrounding the shaft is cam shaped as indicated at 34 and on the shaft is a lateral projection, 35, engaging with the cam. On the upper end of the shaft is an operating handle, 36. The parts are so proportioned that when the shaft 32 is turned into position to bring the axis of the wheel 31 at right angles to the rail, the lug or projection 35 will lie under the lowest point of the cam 34, bringing the wheel low enough to cause the weight of the rear end of the machine to be shifted to it from the seat 30. When the parts are in this condition and the clamps at the front end of the machine are released, the machine may be rolled along the rail. When the shaft 32 is turned through an angle of ninety degrees to the position illustrated in Figs. 2 and 3, the lug or projection 35 comes underneath the high points of the cam 34, so that the wheel no longer offers any support for the rear end of the machine.

In Figs. 5 to 8 I have illustrated several arrangements in which the motor is carried by the vertically movable slide on which the saw is mounted. Referring first to Figs. 5, 6 and 7, 40 represents the base of a machine which may be substantially like the front end of that in Figs. 1 to 4, the rearward extension being unnecessary by reason of the fact that the motor is not carried thereby. The saw and its operating mechanism, including the shafts 5 and 9, are the same as in the other form. The slide 4 is provided at its upper end with a number of upwardly projecting posts or arms, 41, upon which is seated the motor 14. In this arrangement, the motor and the shaft 5 may be geared together by simple spur gears, 42 and 43, since the motor shaft and the shaft 5 maintain at all times a fixed relation to each other. Since the placing of the motor at the top brings the center of gravity of the machine a considerable distance above the rail, it is advisable to provide means for insuring stability of the machine. In the arrangement shown in Fig. 5, there is an arm, 45, extending diagonally from the top of the upright portion 4 of the stationary frame far enough to one side to reach the other rail, 46, of a track in which the rail to be sawed lies. The arm 45 may be provided with a wheel, 47, adapted to rest upon the rail 46. Instead of the wheel 47, a suitable clamping jaw, 48, may be used, as illustrated in Fig. 6, this clamping jaw being adapted to be locked to the rail so as to afford a very rigid support for the machine.

Instead of attempting to brace the machine by means of an arm extending from one rail of a track to the other, a somewhat similar brace, but more universal in its action, as illustrated in Fig. 8, may be provided. Referring to Fig. 8, 50 represents an upward extension of one or both of the upright parts 4 of the stationary frame. At the upper end of each of the members 50 is hinged a leg, 51, preferably provided with an extensible pointed end, 52. The extensible leg is made long enough so that it may be arranged at any convenient angle and yet have its free end firmly set into the ground or other supporting surface.

Arranged at the opposite sides of the standard at the forward end thereof I desirably provide suitably supporting rollers 60, 60 journaled in brackets 61, 61 adjustably secured to the uprights 4 of the standard by means of securing bolts 62 fitted to elongated slots 63 in the brackets 61 as shown. Upon lowering of the brackets a rolling support for the forward end of the device is provided whereby the same may be wheeled from place to place and when in position for use the brackets may be elevated so as not to interfere with the proper positioning of the machine upon the rail.

In a suitably elevated position upon the machine there is supported an oil reservoir 54 having an outlet valve 55 and a suitable flexible pipe 56 leading therefrom and having its lower end in close proximity to the saw 2 so as to deliver the oil thereon to lubricate and cool the saw.

I claim:

1. In a machine of the character described, a frame, a clamping device at one end of the frame adapted to clamp it upon a railway rail, sawing mechanism mounted on said frame, and a rolling support at the other end of the frame movable from a position in which it bears the weight of at least a portion of the frame to a position in which it permits the entire weight of the frame to be borne directly by the rail.

2. In a machine of the character described having a supporting frame, a circular saw suitably journaled and a motor on the frame for operating the saw, a clamping device at one end of the frame adapted to clamp it to the rail, and said frame having a bearing portion at its opposite end adapted to rest upon the rail and having shoulders on each side to engage the sides of the rail to prevent lateral displacement of the frame, and a roller support for the frame arranged in alinement with said bearing portion and comprising a supporting member, a roller journaled therein, cam engaging means between the supporting member and the frame adapted in one position of the support to raise the frame to be supported by the roller and in another position to lower the frame to bear directly on the rail, and a lever to shift the support substantially as described.

In testimony whereof, I sign this specification.

EBEN R. PACKER.